United States Patent [19]
Lorcks et al.

[11] Patent Number: 6,096,809
[45] Date of Patent: Aug. 1, 2000

[54] BIOLOGICALLY DEGRADABLE POLYMER MIXTURE

[75] Inventors: Jurgen Lorcks, Rees; Winfried Pommeranz, Enger; Harald Schmidt, Emmerich, all of Germany

[73] Assignee: Bio-Tec Biologische Naturverpackungen GmbH & Co. KG, Germany

[21] Appl. No.: 08/930,748

[22] PCT Filed: Apr. 2, 1996

[86] PCT No.: PCT/IB96/00275

§ 371 Date: Dec. 15, 1997

§ 102(e) Date: Dec. 15, 1997

[87] PCT Pub. No.: WO96/31561

PCT Pub. Date: Oct. 10, 1996

[30] Foreign Application Priority Data

Apr. 7, 1995 [DE] Germany .......................... 195 13 237
Apr. 24, 1995 [DE] Germany .......................... 195 15 013

[51] Int. Cl.[7] .............................. C08L 3/02; C08L 67/00
[52] U.S. Cl. ........................... 524/47; 524/386; 524/539; 524/605; 525/54.24; 523/128; 528/308.6
[58] Field of Search .......................... 524/47, 605, 539, 524/386; 525/54.24; 528/308.6; 523/128

[56] References Cited

U.S. PATENT DOCUMENTS

| | | | |
|---|---|---|---|
| 3,446,079 | 5/1969 | Hohenstein .......................... | 73/517 |
| 3,850,863 | 11/1974 | Clenninning et al. ................... | 260/7.5 |
| 3,867,324 | 2/1975 | Clendinning et al. .................. | 260/23 H |
| 3,921,333 | 11/1975 | Clendinning et al. ...................... | 47/37 |
| 3,949,145 | 4/1976 | Otey et al. .............................. | 428/423 |
| 4,076,846 | 2/1978 | Nakatsuka et al. ........................ | 426/62 |
| 4,133,784 | 1/1979 | Otey et al. ......................... | 260/17.4 ST |
| 4,306,059 | 12/1981 | Yokobayashi et al. ...................... | 536/1 |
| 4,394,930 | 7/1983 | Korpman ................................ | 220/444 |
| 4,410,571 | 10/1983 | Korpman ............................... | 427/385.5 |
| 4,454,268 | 6/1984 | Otey et al. ................................ | 524/47 |
| 4,482,386 | 11/1984 | Wittwer et al. ........................ | 106/135 |
| 4,655,840 | 4/1987 | Wittwer et al. ........................ | 106/126 |
| 4,673,438 | 6/1987 | Wittwer et al. ........................ | 106/126 |
| 4,846,932 | 7/1989 | Karita et al. ............................ | 162/127 |
| 4,863,655 | 9/1989 | Lacourse et al. ........................ | 264/53 |
| 5,035,930 | 7/1991 | Lacourse et al. ...................... | 428/35.6 |
| 5,043,196 | 8/1991 | Lacourse et al. ...................... | 428/35.6 |
| 5,059,642 | 10/1991 | Jane et al. .............................. | 524/52 |
| 5,095,054 | 3/1992 | Lay et al. ................................ | 524/47 |
| 5,108,807 | 4/1992 | Tucker ................................. | 428/35.2 |
| 5,110,838 | 5/1992 | Tokiwa et al. ............................ | 521/81 |
| 5,115,000 | 5/1992 | Jane et al. ................................. | 524/47 |
| 5,185,382 | 2/1993 | Neumann et al. ...................... | 521/84.1 |
| 5,186,990 | 2/1993 | Starcevich .............................. | 428/35.6 |
| 5,206,087 | 4/1993 | Tokiwa et al. ............................ | 428/403 |
| 5,208,267 | 5/1993 | Neumann et al. ......................... | 521/79 |
| 5,234,977 | 8/1993 | Bastioli et al. ............................ | 524/47 |
| 5,248,702 | 9/1993 | Neumann et al. ...................... | 521/84.1 |
| 5,252,271 | 10/1993 | Jeffs ..................................... | 264/54 |
| 5,256,711 | 10/1993 | Tokiwa et al. ............................ | 524/47 |
| 5,258,430 | 11/1993 | Bastioli et al. ............................ | 524/52 |
| 5,262,458 | 11/1993 | Bastioli et al. ............................ | 524/52 |
| 5,266,368 | 11/1993 | Miller .................................. | 428/35.6 |
| 5,272,181 | 12/1993 | Boehmer et al. ...................... | 521/84.1 |
| 5,275,774 | 1/1994 | Bahr et al. .............................. | 264/211 |
| 5,280,055 | 1/1994 | Tomka ................................... | 524/47 |
| 5,286,770 | 2/1994 | Bastioli et al. ........................... | 524/52 |
| 5,288,318 | 2/1994 | Mayer et al. ............................ | 106/213 |
| 5,288,765 | 2/1994 | Bastioli et al. ......................... | 521/84.1 |
| 5,292,782 | 3/1994 | Bastioli et al. ............................ | 524/47 |
| 5,308,879 | 5/1994 | Akamatu et al. ....................... | 521/84.1 |
| 5,314,754 | 5/1994 | Knight .................................. | 428/532 |
| 5,314,934 | 5/1994 | Tomka ................................... | 524/53 |
| 5,317,037 | 5/1994 | Golden et al. .......................... | 523/128 |
| 5,360,830 | 11/1994 | Bastioli et al. ......................... | 521/84.1 |
| 5,362,777 | 11/1994 | Tomka ................................... | 524/47 |
| 5,372,877 | 12/1994 | Kannankeril ........................... | 428/283 |
| 5,382,611 | 1/1995 | Stepto et al. ............................. | 524/47 |
| 5,389,322 | 2/1995 | Kim et al. ............................... | 264/112 |
| 5,393,804 | 2/1995 | George et al. .......................... | 523/128 |
| 5,397,834 | 3/1995 | Jane et al. .............................. | 525/54.1 |
| 5,405,564 | 4/1995 | Stepto et al. ............................ | 264/115 |
| 5,412,005 | 5/1995 | Bastioli et al. ........................... | 524/47 |
| 5,415,827 | 5/1995 | Tomka et al. .......................... | 264/510 |
| 5,427,614 | 6/1995 | Wittwer et al. ......................... | 106/213 |
| 5,436,078 | 7/1995 | Bühler et al. ......................... | 428/474.4 |
| 5,462,980 | 10/1995 | Bastioli et al. ............................ | 524/47 |
| 5,476,621 | 12/1995 | Kustner ................................. | 264/53 |
| 5,480,923 | 1/1996 | Schmid et al. ........................... | 524/47 |
| 5,500,465 | 3/1996 | Krishnan et al. ......................... | 524/47 |
| 5,512,090 | 4/1996 | Franke et al. ......................... | 106/154.1 |
| 5,525,281 | 6/1996 | Lörcks et al. .......................... | 264/101 |
| 5,844,023 | 12/1998 | Tomka ................................... | 524/47 |

FOREIGN PATENT DOCUMENTS

| | | |
|---|---|---|
| 0 032 802 A1 | 7/1981 | European Pat. Off. . |
| 0045621 | 2/1982 | European Pat. Off. ................. 524/47 |
| 0 327 505 A2 | 8/1989 | European Pat. Off. . |
| 0 400 532 A1 | 12/1990 | European Pat. Off. . |
| 0 407 350 A2 | 1/1991 | European Pat. Off. . |
| 0 408 502 A2 | 1/1991 | European Pat. Off. . |
| 0 408 503 A2 | 1/1991 | European Pat. Off. . |
| 0 409 781 A2 | 1/1991 | European Pat. Off. . |
| 0 409 782 A3 | 1/1991 | European Pat. Off. . |
| 0 524 920 A1 | 1/1993 | European Pat. Off. . |
| WO 93/00399 | 1/1993 | European Pat. Off. . |
| 0 525 245 A1 | 2/1993 | European Pat. Off. . |
| 0 539 541 B1 | 5/1993 | European Pat. Off. . |
| 0535994 | 7/1993 | European Pat. Off. . |
| 0596437 | 5/1994 | European Pat. Off. . |
| 641817 | 8/1995 | European Pat. Off. . |
| 4237535 | 5/1994 | Germany . |
| 9005161 | 3/1988 | WIPO . |
| 9209654 | 6/1992 | WIPO . |
| 9307213 | 4/1993 | WIPO . |

OTHER PUBLICATIONS

International Preliminary Exam Report (IPER), PCT/IB96/00275, published Aug. 26, 1996.

Mater Bi, *Stärkewerkstoffe Sind Reif Für Breite Anwendungen* (1982).

*Primary Examiner*—Andrew E. C. Merriam
*Attorney, Agent, or Firm*—Workman, Nydegger & Seeley

[57] ABSTRACT

A biologically degradable polymer mixture contains at least one starch biopolymer made from renewable raw materials, a plasticizer, and a polymer selected from the following materials: an aromatic polyester; a polyester-copolymer with both aliphatic and aromatic blocks; a polyesteramide; a polyglycol; a polyester urethane; and/or mixtures of these components.

30 Claims, No Drawings

BIOLOGICALLY DEGRADABLE POLYMER MIXTURE

The present invention relates to a biologically degradable polymer mixture, to a process for its preparation and to a method of processing the polymer mixture according to the invention.

Proposals for the preparation of biologically degradable polymer mixtures are known from a large number of patent documents and articles. The great problem in the case of polymer mixtures lies, as a rule, in that those mixtures which have an excellent, biological degradability have only limited possibilities for use in the area of engineering plastics, thereby explaining the relatively modest success to date. Polymer mixtures having improved properties are either biologically inadequate or degradable with increased effort, or else are too expensive.

From EP-535 994 a polymer mixture is known essentially consisting of starch and an aliphatic polyester, for example polycaprolactone, where the starch is preferably destructured with water.

Aliphatic polyesters are, per se, suitable mixing components for the preparation of biologically degradable polymer mixtures, since they have a good biological degradability. However, aliphatic polyesters have only moderate material properties, for example with regard to melting point, tensile strength, etc., which is why even corresponding mixtures using a polymer prepared on the basis of renewable raw materials, for example thermoplastic starch, have only moderate properties, thereby again placing in question the possibility for use in the field of engineering plastics.

It is therefore an object of the present invention to propose a biologically degradable polymer mixture which both is flawlessly degradable biologically and in addition has good mechanical and thermal properties, so that use as an engineering plastic or as a polymer material is appropriate. A further prerequisite for suitability as a polymer material also lies in the price for the polymer mixture proposed having an acceptable magnitude.

The multitude of biopolymers or biologically degradable polymer mixtures proposed in the prior art are to a great extent in accordance with object having an acceptable magnitude.

In accordance with the invention the object proposed above is achieved by means of a biologically degradable polymer mixture in accordance with the wording of claim 1.

The multitude of biopolymers or biologically degradable polymer mixtures proposed in the prior art are to a great extent constructed on the basis of starch or use starch, although native starch is hardly suitable as a technically usable polymer. Starch is proposed because it is readily degradable biologically, has a favorable price and is independent of petroleum products because it is based on a renewable raw material. Because of the poor suitability of native starch as an "engineering plastic" it is proposed according to the invention to use so-called thermoplastic starch, as is proposed, for example, in PCT/WO90/05161. This thermoplastic starch is obtained by processing native starch in the melt, by means of a plasticizing or swelling agent, to a homogeneous mass, where the proportion of swelling or plasticizing agent can as a rule amount to between 10 and about 40%, based on the overall weight of the mixture. [As set out in claim 4,] Suitable swelling or plasticizing agents are, inter alia, for example, glycerol or sorbitol.

Particularly suitable materials for improving the rather moderate material properties of thermoplastic starch include:

The aliphatic polyesters proposed in the prior art, which although having good biological degradability are not particularly suitable because of their likewise moderate material properties with regard to melting point and drawability, themselves contribute to an improvement in the material properties of the thermoplastic starch. In contrast, aromatic polyesters exhibit excellent material properties but their biological degradability is rather moderate. On the other hand, inter alia, polyester copolymers based on aromatic and aliphatic dicarboxylic acids, polyesteramides and also polyesterurethanes have both outstanding material properties and a rapid biological degradability, which is why they are particularly suitable for use in polymer mixtures with thermoplastic starch.

The polyester copolymers proposed for use in accordance with the invention in the polymer mixture with thermoplastic starch are constructed on the basis, besides the customarily used polyols, of aromatic and aliphatic dicarboxylic acids, and have the following general structure:

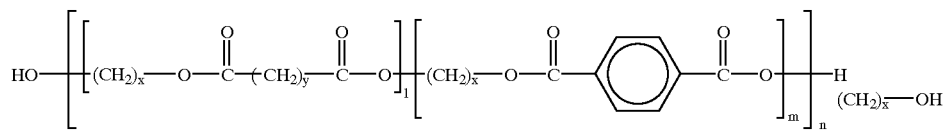

The polyester copolymers proposed according to the invention can be prepared from petrochemical mass products, such as adipic acid, sebacic acid, terephthalic acid and a diol by means of polycondensation, with commercially customary diols, such as 1,2-ethanediol, 1,3-propanediol, 1,4-butanediol and/or 1,6-hexanediol being used. What is important is that both aromatic and aliphatic dicarboxylic acids are used, by means of which the statistical polyester copolymers are prepared, for example by means of a conventional polycondensation process.

Statistical copolyesters of aliphatic and aromatic dicarboxylic acids with a proportion, for example, of about 35–55 mol % of aromatic acid, for example terephthalic acid, represent an optimum compromise between biological degradability and material properties, as a result of which they are particularly suitable in mixtures with thermoplastic starch. The biological degradability of statistical copolyesters of this kind lies within 8–12 weeks in compost and earth. In this context reference may be made to U.S. Pat. No. 5,446,079, in which the preparation of aliphatic-aromatic copolyesters is described in detail.

Polyalkylene terephthalates and polyethylene terephthalates which are prepared from aliphatic diols and aromatic dicarboxylic acids have proven, for example, to be suitable copolyesters for the preparation of a starch/polyester copolymer blend according to the invention.

In addition to the starch/polyester copolymer blends described above and proposed according to the invention it has become evident that polyesteramides filled or blended with starch or thermoplastic starch and with ester contents of between 30 and 70% by weight have good mechanical properties, even for the production of films, and have good degradability and compostibility. Proposed are, for example, polyesteramides having a mean molecular weight in a range of 10–300,000, preferably 20–150,000. Otherwise reference may be made to the European patent application EP-A-641 817, in which the synthesis of the polyesteramides proposed in accordance with the invention is described in detail. Mention should merely be made that polyesteramides according to the invention can be constructed from monomers of the following groups:

- dialcohols, such as ethylene glycol, 1,4-butanediol, 1,3-propanediol, 1,6-hexanediol diethylene glycol and others; and/or
- dicarboxylic acid, such as oxalic acid, succinic acid, adipic acid and others, including those in the form of their respective esters (methyl, ethyl etc.); and/or
- hydroxycarboxylic acids and lactones, such as caprolactone and others; and/or
- amino alcohols, such as ethanolamine, propanolamine etc.; and/or
- cyclic lactams, such as E-caprolactam or laurolactam etc.; and/or
- ω-aminocarboxylic acids, such as aminocaproic acid etc.: and/or
- mixtures (1:1 salts) of dicarboxylic acids such as adipic acid, succinic acid etc. and diamines such as hexamethylenediamine, diaminobutane etc.

In the case where the polymer mixture is based extensively on thermoplastic starch and an aromatic polyester, an aliphatic-aromatic copolyester or a polyesteramide it may be advantageous to add an aliphatic polyester or copolyester, such as polycaprolactone, for example, as a further component. By this means the relatively poor biological degradability, for example, of the aromatic polyester is compensated by the excellent degradability of the aliphatic polyester. As an example of this there may be mentioned a polymer mixture consisting of thermoplastic starch, at least one polyethylene terephthalate (PET) or a polyalkylene terephthalate, and polycaprolactone. Other examples of aliphatic polyesters or copolyesters are polylactic acid, polyhydroxybutyric acid, polyhyroxybenzoic acid, polyhydroxybutyric acid-hydroxy-valeric acid copolymer and/or mixtures thereof.

Depending on how the preparation of the polymer mixture is carried out it is advantageous if this mixture additionally contains a block copolymer as phase mediator in order to form a continuous, homogeneous phase between the thermoplastic starch and the hydrophobic polymer in the form of the polyester. A phase mediator of this kind can, for example, be a reaction mixture obtained by essentially anhydrous mixing of thermoplastic starch or, if desired, native or destructured starch with an aliphatic or aromatic polyester or copolyester, with an aromatic/aliphatic copolyester, with a polyesteramide and/or a polyesterurethane.

The proportion of thermoplastic starch containing the above-mentioned plasticizing or swelling agent can make up a proportion of between 10–95% by weight, based on the overall weight, in the polymer mixture proposed in accordance with the invention; preferably, 30–75% by weight of thermoplastic starch is used. The proportion of thermoplastic starch depends on the one hand on the polyester or copolyester used and on the other hand on the intended use of the polymer mixture, such as injection molding, extrusion or film blowing. The requirements with regard to the material properties also influence the proportion of thermoplastic starch. If, for example, heightened material requirements with respect to mechanical and thermal properties are imposed, a proportion of thermoplastic starch in the range of 40–65% by weight will preferably be targeted; consequently, the price of the mixture remains acceptable in any case.

Also a subject of the present invention are mixtures containing 90–30, especially 80–40% by weight of thermoplastically processible polyesteramides comprising 30–70% by weight aliphatic esters and 70–30% by weight aliphatic amide structures, where, furthermore, preferably 10–90% by weight, in particular 20–60% by weight of starch or thermoplastic starch are contained.

The addition of further additives, such as plasticizers, stabilizers, antiflaming agents and also further, biologically degradable polymers, such as cellulose esters, cellulose acetate, cellulose, polyhydroxybutyric acid, hydrophobic proteins, polyvinyl alcohol, etc., is possible and again is guided by the requirements with regard to the polymer mixture to be prepared and of course also by the availability of the corresponding components. The polymers indicated below are also suitable as additives, such as gelatins, proteins, zeins, polysaccharides, cellulose derivatives, polylactides, polyvinyl alcohol, polyvinyl acetate, polyacrylates, sugar alcohols, shellac, casein, fatty acid derivatives, plant fibers, lecithin, chitosan, polyesterpolyurethanes and polyesteramides. Mention should also be made of polyester blends consisting of thermoplastic starch, the aliphatic/aromatic polyester proposed according to the invention and, as further component, copolymers selected from ethylene-acrylic acid copolymer and ethylene-vinyl alcohol copolymer.

Also suitable as fillers are, in particular, organic fillers obtained from renewable raw materials, for example cellulose fibers.

In order to reduce the hydrophilic polymer properties of materials comprising thermoplastic starch it is also possible to add crosslinking agents, for example alkylketene dimers of the following general formula:

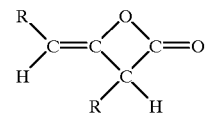

where R=linearly saturated alkyl group in the range from C12–C24. The concentration of such network agents amounts as a rule to about 0.05–2%, based on the weight, proportion of dry thermoplastic starch in the polymer mixture, preferably 0.1–1% by weight. The proposed alkylketene dimers react in this case with the hydroxyl groups of the starch polymer.

The preparation of the polymer mixture proposed according to the invention takes place by mixing starch, such as preferably thermoplastic starch, together with the aromatic polyester and/or the polyester copolymer containing aromatic and aliphatic constituents in the melt, the water content in the mixture being reduced before or during mixing to less than 1% by weight, based on the weight of the mixture.

Especially in the case of the exclusive use of an aromatic polyester together with the thermoplastic starch for the preparation of the polymer mixture it has proven advantageous to add, in addition, an aliphatic polyester during the preparation. Examples of suitable aliphatic polyesters are, for example, polycaprolactone, polylactic acid, etc., as already set out above. Further suitable aliphatic polyesters are, for example, polyethylene succinate (PESU) and polybutylene succinate (PBSU). The latter aliphatic polyesters are formed by reaction of glycols with aliphatic dicarboxylic acids and other acids and have the following general structural formula:

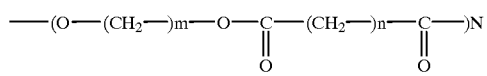

In every case it is proposed, in accordance with a preferred variant embodiment of the process according to the invention, to reduce the water content during the mixing of the melt to below 0.5% by weight, preferably even to below 0.1% by weight, based on the overall weight of the mixture.

In the preparation of the polymer mixture proposed in accordance with the invention, the thermoplastic starch is present to begin with as a so-called disperse phase, while the polyester or the copolyester, the polyesteramide or the polyesterurethane, representing a hydrophobic polymer, is present as a substantially coherent, continuous phase. An obvious supposition, then, is that when the two polymers are mixed with the exclusion of water the ester groups incorporated in the molecule chains of the polyester or copolyester, etc. undergo esterification reactions with the thermoplastic starch, as a result of which the molecule chains reacting in this way form a phase mediator with the starch which allows a molecular coupling of the two phases, and consequently a continuous phase is formed. In the case of moisture this reaction is in competition, since in the presence of water the acid ester groups do not react with the starch, to form the phase mediator, but instead are hydrolyzed. This, however, prevents formation of the phase mediator, which renders flawless dispersing or homogenizing impossible. It is of course possible to use a phase mediator from the outset, such as a block copolymer which comprises at least two blocks, one block being at least substantially soluble in the hydrophobic polyester phase and the other block being at least substantially soluble in the starch phase. In this context reference may be made to DE-42 37 535.5.

Depending on the aromatic, aliphatic, aromatic/aliphatic copolyester polyesteramide and/or polyesterurethane used, mixing is conducted in the melt in a temperature range between 120–260° C., preferably in a range of 140–160° C. The mixing temperature must be chosen so that no damage can occur to the polyester or copolyester used. The mixing of the thermoplastic starch with the polyester component or components, together if desired with further additives and components, takes place preferably in an extruder or kneader, which preferably has a devolatilizing device, for the continuous removal of moisture, in order to attain the required freedom from water. It has been found that, when the thermoplastic starch is mixed with the polyester or polyesters, water is formed, which allows one to draw the conclusion of, for example, the above-mentioned reaction of the ester groups with the starch to form the phase mediator. On leaving the extruder or kneader through the die the melt has an extremely low water content, preferably <0.5 or <0.1% by weight. After removal from the die the melt is preferably cooled in a water bath and conditioned before being subjected subsequently granulated, for example. It has proven advantageous if the melt, which is dry per se, is cooled in a water bath so that it absorbs within the order of magnitude of 2—about 6% by weight, based on the overall weight, of water, in order to ensure flawless granulation.

The polymer mixture prepared in accordance with the invention, comprising at least thermoplastic starch and, for example, the polyester copolymer comprising aromatic and aliphatic blocks, is outstandingly suitable as a polymer material for a very wide variety of applications in the field of so-called "engineering plastics". Processing in the injection molding process, as well as by extrusion and film blowing, is possible, for instance. However, when processing the polymer mixture according to the invention it has been found advantageous if the polymer mixture, which is present for example as granules, is conditioned before processing, either by means of water or with a plasticizer, such as glycerol or a mixture thereof. The target is, for example, a water content of about 1–6% by weight, based on the overall weight, preferably 3–5% by weight, as is usual, for example, in the processing of polyesters. Also, the injection moldings, extrudates or films produced are preferably stored directly after their preparation in an environment having a relative humidity of at least 40%, preferably at least 45–50%.

Examples of possible and preferred polymer mixtures, exhibiting at least starch or thermoplastic starch and a hydrophobic polymer as claimed in one of the dependent claims 2–15 or prepared in accordance with a process set out in one of claims 16–22 are listed in Tables 1–4 depicted below. These examples are supplemented by an additional experiment 29.

The total of 29 examples indicated in this case include both components which have been used for the preparation of thermoplastic starch in the sense of plasticizing agents or swelling agents and the possible polymeric mixing partners to the thermoplastic starch for the preparation of the polymer mixtures proposed in accordance with the invention. The tables include, moreover, the processing conditions and, in particular, the water content in the extruder which prevails during the preparation of the polymer mixture, and which without exception amounted to <than 0.1% by weight. In addition, preferred application options for the polymer mixtures prepared by way of example are set out in the tables. The tables of course contain only examples, and all components mentioned at the outset are suitable for mixing with starch or thermoplastic starch for preparing starting polymer mixtures, defined in accordance with the invention, for both technical and nontechnical applications.

TABLE 1

| Example | Examples | | | | | | |
| --- | --- | --- | --- | --- | --- | --- | --- |
| | 1 | 2 | 3 | 4 | 5 | 6 | 7 |
| [1]Starch % | 42.2 | 24.0 | 29.9 | 24.0 | 33.0 | 38.0 | 21.5 |
| [1]Sorbitol % | 14.0 | 8.0 | 9.5 | 8.0 | 9.9 | 11.8 | 6.9 |
| [1]Glycerol % | 9.5 | 6.0 | 6.5 | 6.0 | 7.9 | 9.3 | 2.1 |
| [2]TPS % | 60.5 | 34.9 | 42.0 | 34.9 | 46.7 | 54.5 | 27.8 |

TABLE 1-continued

| Example | 1 | 2 | 3 | 4 | 5 | 6 | 7 |
|---|---|---|---|---|---|---|---|
| $H_2O$ % | <0.1 | <0.1 | <0.1 | <0.1 | <0.1 | <0.1 | <0.1 |
| [3]PLA % | — | — | — | — | 40.0 | 10.9 | — |
| [4]Polyamide 1 | 34.3 | 50.0 | — | — | — | 9.2 | — |
| [5]Polyester 1 | — | — | 54.1 | 45.0 | — | 30.0 | 69.5 |
| [6]PCL % | — | 12.0 | — | 17.0 | — | — | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 212 | 225 | 210 | 210 | 215 | 210 | 200 |
| Pressure bar | 8.5 | 2.0 | 2.5 | 2.5 | 6.2 | 7.5 | 0.5 |
| MFI g/10' | 9 | 13 | 11.5 | 13 | 8.5 | 8.0 | 29 |
| Granules | 4 mm | 4 mm | 4 mm | 4 mm | 4 mm | 4 mm | 4 mm |
| Gra $H_2O$ % | 3.0 | 3.6 | 3.4 | 3.6 | 3.4 | 3.4 | 3.0 |
| Application | | | | | | | |
| Blown film | + | + | + | + | + | + | − |
| Flat film | + | + | + | + | + | + | − |
| Sheets | + | + | + | + | + | + | − |
| Injection molding | + | − | − | − | − | − | − |
| Fibers | − | + | − | + | − | − | + |

[1]Starch = native potato starch dried 3.5% $H_2O$, sorbitol = sorbitol LG DHR 71%, glycerol 99.5%;
[2]TPS = thermoplastic starch = starch + sorbitol + glycerol < 0.1% $H_2O$. — Water content by devolatilization, according to the known process EP 0 397 819 anhydrous TPS consists of starch, sorbitol and glycerol;
[3]PLA (polylactic acid resin) — Mitsui Toatsu Chemicals LACEA H 100 MFR 13 190° C. 2.16 kg:
[4]Polyamide 1 = Bayer BAK 1095 polyesteramide MFI 2.5 150° C. 2.16 kg;
[5]Polyester 1 = BASF ZK 242/108 copolyester of aliphatic diols and aliphatic/aromatic dicarboxylic acids MVR 3.0 at 190° C./2.16 kg;
[6]PCL (polycaprolactone) + Union Carbide Tone Polymer P-787 MFI 1.0 125° C. 44 psi g/10 min;
[7]Extrusion Equipment = Werner & Pfleiderer ZSK 40;
*0.1–0.4% water content

TABLE 2

| Example | 8 | 9 | 10 | 11 | 12 | 13 | 14 |
|---|---|---|---|---|---|---|---|
| [1]Starch % | 38.2 | 24.6 | 29.2 | 24.6 | 30.7 | 28.0 | 21.5 |
| [1]Sorbitol % | 12.8 | 8.2 | 9.4 | 8.8 | 9.1 | 8.8 | 6.9 |
| [1]Glycerol % | 8.5 | 6.0 | 6.2 | 6.0 | 7.4 | 6.2 | 4.1 |
| [2]TPS % | 54.5 | 35.5 | 41.1 | 36.0 | 43.5 | 39.5 | 29.7 |
| $H_2O$ % | <0.1 | <0.1 | <0.1 | <0.1 | <0.1 | <0.1 | <0.1 |
| [3]PPDX % | 34.0 | — | — | 6.5 | — | — | 33.8 |
| [4]PT-C300 | — | — | 45.1 | — | — | — | — |
| [5]PT-T8-200 | — | 32.5 | — | — | 47.0 | 57.0 | — |
| [6]BAK | 6.5 | 28.7 | 10.1 | 54.1 | 5.8 | — | 33.7 |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 220 | 214 | 240 | 215 | 215 | 210 | 205 |
| Pressure bar | 6.5 | 3.5 | 5.5 | 7.5 | 4.5 | 7.5 | 0.5 |
| MFI g/10' | 8 | 13 | 2.5 | 11.5 | 8.5 | 8.0 | 30 |
| Granules | 4 mm | 4 mm | 4 mm | 4 mm | 4 mm | 4 mm | 4 mm |
| Gra $H_2O$ % | 3.9 | 3.6 | 3.5 | 3.3 | 3.4 | 3.6 | 3.2 |
| Application | | | | | | | |
| Blown film | + | + | + | + | + | + | − |
| Flat film | + | + | + | + | + | + | − |
| Sheets | + | + | + | + | + | + | − |
| Injection molding | + <0.15* | − | + <0.4* | − | − | − | − |
| Fibers | − | − | − | − | − | − | + |

[1]Starch = native potato starch dried 3.5% $H_2O$, sorbitol = sorbitol LG DHR 71%, glycerol 99.5%;
[2]TPS = thermoplastic starch = starch + sorbitol + glycerol < 0.1% $H_2O$. — Water content by devolatilization, according to the known process EP 0 397 819 anhydrous TPS consists of starch, sorbitol and glycerol;
[3]PPDX. Polyparadioxanone. Shell International Chemicals Ltd. peak melting deg ° C. 110.;
[4]PT-C300ZT. Enviro Plastic, Plantet Polymers, VICAT Softening Temp. 89° C. Polyethylene oxide polymers;

TABLE 2-continued

| | Examples | | | | | | |
|---|---|---|---|---|---|---|---|
| Example | 8 | 9 | 10 | 11 | 12 | 13 | 14 |

[5]PT-T8-200DL. Enviro-Plastic C. Planet Polymers, Polyethylene oxide polymers;
[6]Polyesteramide BAK 1095, Bayer AG, MFI 2.5 150° C., 2.16 kg;
[7]Extrusion Equipment = Werner & Pfleiderer ZSK 40;
*0.1–0.4% water content

TABLE 3

| | Examples | | | | | | |
|---|---|---|---|---|---|---|---|
| Example | 15 | 16 | 17 | 18 | 19 | 20 | 21 |
| [1]Starch % | 20.9 | 24.6 | 20.4 | 24.6 | 9.2 | 9.2 | 9.2 |
| [1]Sorbitol % | 7.0 | 8.2 | 6.6 | 8.8 | 2.7 | 2.7 | 2.7 |
| [1]Glycerol % | 4.7 | 6.0 | 4.4 | 6.0 | 2.2 | 2.2 | 2.2 |
| [2]TPS % | 29.9 | 35.5 | 28.6 | 36.0 | 13.0 | 13.0 | 13.0 |
| $H_2O$ % | <0.1 | <0.1 | <0.1 | <0.1 | <0.1 | <0.1 | <0.1 |
| [3]Filler % | 26.9 | — | 25.0 | — | 60.0 | — | 60.0 |
| [4]Polyamide 1 | 40.5 | 36.2 | — | — | 25.9 | 27.9 | — |
| [5]Polyester 1 | — | — | 43.6 | 35.6 | — | — | 25.9 |
| [6]Filler % | — | 25.0 | — | 25.0 | — | 58.0 | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 203 | 206 | 220 | 21S | 205 | 20S | 220 |
| Pressure bar | 156.5 | 21 | 15 | 22 | 3S | 40 | 35 |
| MFI g/10' | 13 | 9 | 12.5 | 8.5 | 3 | 2.8 | 2.2 |
| Granules | 4 mm | 4 mm | 4 mm | 4 mm | 4 mm | 4 mm | 4 mm |
| Gra $H_2O$ % | 3.5 | 3.6 | 3.4 | 3.6 | 3.4 | 3.4 | 3.0 |
| Application | | | | | | | |
| Blown film | - | - | - | - | - | - | - |
| Flat film | (+) | (+) | (+) | (+) | - | - | - |
| Sheets | + | + | + | + | + | + | + |
| Injection molding | + <0.2%* | + <0.2%* | + <0.2%* | + <0.2%* | + <0.2%* | + <0.2%* | + <0.2%* |
| Fibers | - | - | - | - | - | - | - |

[1]Starch = native potato starch dried 3.5% $H_2O$, sorbitol = sorbitol LG DHR 71%, glycerol 99.5%;
[2]TPS = thermoplastic starch = starch + sorbitol + glycerol < 0.1% $H_2O$. — Water content by devolatilization, according to the known process EP 0 397 819 anhydrous TPS consists of starch, sorbitol and glycerol;
[3]Filler, microized cellulose;
[4]Polyamide 1 = Bayer BAK 1095 polyesteramide MFI 2.5 150° C. 2.16 kg;
[5]Polyester 1 = BASF ZK 242/108 copolyester of aliphatic diols and aliphatic/aromatic dicarboxylic acids MVR 3.0 at 190° C./2.16 kg;
[6]Filler, micronized cotton
[7]Extrusion Equipment = Werner & Pfleiderer ZSK 40;
*0.1–0.4% water content

TABLE 4

| | Examples | | | | | | |
|---|---|---|---|---|---|---|---|
| Example | 22 | 23 | 24 | 25 | 26 | 27** | 28** |
| [1]Starch % | 34.5 | 35.5 | 40.5 | 50.5 | 60.7 | 70.3 | 67.8 |
| [1]Sorbitol % | — | — | — | — | — | — | — |
| [1]Glycerol % | 16.3 | 16.5 | 12.0 | 7.1 | 4.0 | 4.5 | — |
| [2]Polyamide 1 | 25.0 | 23.5 | 47.5 | 42.4 | 35.3 | 25.2 | 32.2 |
| [3]TPS % | 74.8 | 74.4 | 98.6 | 98.5 | 98.2 | 87.4 | 87.8 |
| $H_2O$ % | <0.1 | <0.1 | <0.1 | <0.1 | <0.1 | <0.1 | <0.1 |
| [4]PLA % | 24.2 | — | — | — | — | — | — |
| [5]Polyester 1 | — | 24.5 | — | — | — | — | — |
| [6] | — | — | — | — | — | — | — |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T ° C. | 200 | 206 | 190 | 170 | 160 | 155 | 155 |
| Pressure bar | 15 | 15 | 20 | 26 | 31 | 35 | 37 |
| MFI g/10' | 12 | 14 | 122.5 | 10 | 6 | 5 | 5.5 |
| Granules | 4 mm | 4 mm | 4 mm | 4 mm | 4 mm | 4 mm | 4 mm |
| Gra $H_2O$ % | 2.1 | 2.1 | 2.2 | 2.6 | 0.4 | 0.4 | 0.3 |

TABLE 4-continued

| | Examples | | | | | | |
|---|---|---|---|---|---|---|---|
| Example | 22 | 23 | 24 | 25 | 26 | 27** | 28** |
| Application | | | | | | | |
| Blown film | + | + | + | + | + | + | + |
| Flat film | + | + | + | + | + | + | + |
| Sheets | + | + | + | + | + | + | + |
| Injection molding | – | – | – | (+) | +<br><0.15%* | +<br><0.2%* | +<br><0.2%* |
| Fibers | – | – | – | – | – | – | – |

[1]Starch = native potato starch dried 3.5% $H_2O$, sorbitol = sorbitol LG DHR 71%, glycerol 99.5%;
[4]Polyamide 1 = Bayer BAK 1095 polyesteramide MFI 2.5 150° C. 2.16 kg, function of plasticizer;
[2]TPS = thermoplastic starch = starch + sorbitol + glycerol and/or BAK 1095, <0.1% $H_2O$. — Water content by devolatilization, according to the known process EP 0 397 819. 27 + 28 starch = native potato starch, 18% $H_2O$:
[3]PLA (Polylactic acid resin) = Mitsui Toatsu Chemicals LACEA H 100 MFR 13 190° C. 2.16 kg;
[5]Polyester 1 = BASF ZK 242/108 copolyester of aliphatic diols and aliphatic/aromatic dicarboxylic acids MVR 3.0 at 190° C./2.16 kg;
[6]PCL (Polycaprolactone) + Union Carbide Tone Polymer P-787 MFI 1.0 125° C. 44 psi g/10 min;
[7]Extrusion Equipment = Werner & Pfleiderer ZSK 40;
*0.1–0.4% water content

EXPERIMENT EXAMPLE 29

In analogy to experiment 28, the polyesteramide BAK 1095 was in example 29 compounded with 10% potato starch in the twin-screw extruder ZSK 40 at 155° C. and 20 bar with removal of water, extruded with 0.15% residual moisture, and, after the polyester extrudate had cooled, was granulated. The polymer mixture has an MFI g/10' of 25 at 150° C./5 kg and is suitable for producing blown and flat films.

Injection moldings, extrudates and films produced by means of polymer mixtures proposed in accordance with the invention have not only relatively good material properties but also an outstanding biological degradability, which is why they are able to make a significant contribution to the acute problem of waste. For example, films produced from a polymer mixture proposed in accordance with the invention are outstandingly suitable for a very wide variety of applications in the agricultural sector, for example for the covering of fields, since such films after their use can either be composted or else ploughed into the earth in the field. Polymer mixtures of this kind are also suitable for the production of composting sacks, containers for composting waste, etc. In addition, containers and bottles, for example, can be produced from the polymer mixture proposed in accordance with the invention by means of blow molding.

The polymer mixtures according to the invention are also suitable, however, for the production of textile articles, for example for the production of fibers, monofilaments, sheetlike structures, such as wovens, felts, nonwovens, so-called backsheets, textile composites, flocks, wadding, and linear structures, for example filaments, yarns, cables, cords, etc. In particular it has been found in practice that the polymer mixtures according to the invention are suitable for the production of sanitary articles, such as diapers, sanitary towels, incontinence products and bed liners. The structure of these hygiene articles includes, inter alia, nonwovens produced from the polymer material according to the invention, since this material has a very good skin compatibility, is respiratorily active, is permeable to water vapor at the same time as being watertight, and yet is fully biologically degradable.

A large proportion of the polymer mixtures proposed in accordance with the invention, especially those containing thermoplastic starch and/or a copolyester and/or a polyesteramide and/or a polyesterurethane, are suitable, moreover, as adhesives or else can be used as coatings, for example for the impregnation of textile wovens. In this case it has been found that the polymer mixtures proposed in accordance with the invention which are suitable for these areas of application are introduced and applied preferably in a form in which they are at least partially dissolved in alcoholic solvents. For example, in connection with experiment example 29 it was found, surprisingly, that the polymer mixture thus prepared is soluble in hot alcohol/ethanol mixture. A 20% strength alcoholic solution directly after preparation has a viscosity of 100''' Pas. In this case too there was a possible use in the context of a biologically degradable adhesive, as a coating or as an impregnation which brings about hydrophobic properties and is permeable to water vapor. The use ascertained with regard to experiment example 29 can also be transferred to a large number of the other experiment examples and to further polymer mixtures proposed in accordance with the invention.

The polymer mixtures according to the invention are, however, of course suitable for umpteen other applications, for example for disposable injection-molded products, etc.

We claim:

1. A composition of matter that is at least partially biodegradable comprising:
   thermoplastic starch formed by mixing starch and at least one plasticizing agent under conditions that result in the formation of a thermoplastic melt so that the thermoplastic melt has a water content of less than 5% while in a melted state, wherein the plasticizing agent is selected from the group consisting of glycerin, sorbitol, sugar alcohols, hydroxy acids, playvinyl alcohol, and mixtures thereof; and
   at least one polymer selected from the group consisting of aromatic polyesters, polyester copolymers having both aliphatic and aromatic blocks, polyester amides, polyethylene oxide polymers, polyglycols, and polyester urethanes, wherein the composition is formed by melting and mixing the thermoplastic starch and the at least one polymer under conditions that reduce or maintain the water content of the composition at less than about 1% by weight while in a melted state.

2. A composition of matter as defined in claim 1 formed by melting and mixing the thermoplastic starch and the at least one polymer under conditions that reduce or maintain the water content of the composition at less than about 0.5% by weight while in a melted state.

3. A composition of matter as defined in claim 1 formed by melting and mixing the thermoplastic starch and the at least one polymer in a manner so as to reduce or maintain the water content of the composition at less than about 0.1% by weight while in a melted state.

4. A composition of matter as defined in claim 1, wherein the polymer comprises a polyester copolymer of at least one polyol and at least one aromatic dicarboxylic acid.

5. A composition of matter as defined in claim 4, wherein the polyol is selected the group consisting of 1,2-ethanediol, 1,3-propanediol, 1,4-butanediol, 1,6-hexanediol, and mixtures thereof, and wherein the aromatic dicarboxylic acid is a terephthalate and, optionally, adipic acid or sebacic acid or both.

6. A composition of matter as defined in claim 1, wherein the polymer is a polyester copolymer of at least one polyol, at least one aromatic dicarboxylic acid and at least one aliphatic dicarboxylic acid.

7. A composition of matter as defined in claim 6, wherein the polyester copolymer is a polyalkylene terephthalate.

8. A composition of matter as defined in claim 1, further comprising at least one aliphatic polyester or copolyester.

9. A composition of matter as defined in claim 8, wherein the aliphatic polyester or copolyester comprises polycaprolactone.

10. A composition of matter as defined in claim 1, further comprising at least one additional component selected from the group consisting of additional plasticizers, stabilizers, antiflaming agents, additional biologically degradable biopolymers, organic fillers, and cross-linking agents.

11. A composition of matter as defined in claim 1, wherein the thermoplastic starch is included in an amount in a range from about 10% to about 95% by weight of the composition.

12. A composition of matter as defined in claim 1, wherein the thermoplastic starch is included in an amount in a range from about 30% to about 65% by weight of the composition.

13. A composition of matter as defined in claim 1, further comprising at least one additional polymer selected from the group consisting of ethylene/acrylic acid copolymer and ethylene/vinyl alcohol copolymer.

14. A composition of matter as defined in claim 1, wherein the composition is formed by mixing and melting the thermoplastic starch and the at least one polymer at a temperature in a range from about 120° C. to about 260° C.

15. A composition of matter as defined in claim 1, wherein the composition is formed by melting and mixing the thermoplastic starch and the at least one polymer in an extruder or kneader and wherein the composition is discharged from the extruder or kneader while in a melted state and subsequently cooled to a substantially solidified state and conditioned so as to reabsorb water.

16. A composition of matter as defined in claim 15, wherein the composition is conditioned so as to include a water content in a range from about 1% to about 6% by weight of the substantially solidified composition.

17. A composition of matter as defined in claim 15, wherein the conditioned composition is in the form of a granulate.

18. A composition of matter as defined in claim 15, wherein the composition is conditioned so as to include a water content in a range from about 3% to about 5% water by weight of the substantially solidified composition.

19. A composition of matter as defined in claim 1, wherein the thermoplastic starch is formed from starch that has been initially predried to below its natural water content.

20. A composition of matter as defined in claim 1, wherein the thermoplastic starch is formed from starch that initially includes its natural water content, wherein the natural water content of the starch is reduced while the thermoplastic starch is in a melted state.

21. A composition of matter that is at least partially biodegradable comprising:

thermoplastic starch formed by mixing starch and at least one plasticizing agent under conditions that result in the formation of a thermoplastic melt so that the thermoplastic melt has a water content of less than 5% while in a melted state, wherein the plasticizing agent is selected from the group consisting of glycerin, sorbitol, sugar alcohols, and mixtures thereof; and at least one polymer selected from the group consisting of aromatic polyesters, polyester copolymers having both aliphatic and aromatic blocks, polyester amides, polyethylene oxide polymers, polyglycols, and polyester urethanes, wherein the composition is formed by melting and mixing the thermoplastic starch and the at least one polymer under conditions that reduce or maintain the water content of the composition at less than about 1% by weight while in a melted state.

22. A composition of matter as defined in claim 21, wherein the thermoplastic starch is formed from starch that has been initially predried to below its natural water content.

23. A composition of matter as defined in claim 21, wherein the thermoplastic starch is formed from starch that initially includes its natural water content, wherein the natural water content of the starch is reduced while the thermoplastic starch is in a melted state.

24. A composition of matter that is at least partially biodegradable comprising:

thermoplastic starch formed by mixing starch and at least one plasticizing agent under conditions that result in the formation of a thermoplastic melt so that the thermoplastic melt has a water content of less than 5% while in a melted state, wherein the plasticizing agent is selected from the group consisting of glycerin, sorbitol, sugar alcohols, hydroxy acids, polyvinyl alcohol, and mixtures thereof;

at least one polymer selected from the group consisting of aromatic polyesters, polyester copolymers having both aliphatic and aromatic blocks, polyester amides, polyethylene oxide polymers, polyglycols, and polyester urethanes; and a phase mediator comprising at least one condensation reaction product of the thermoplastic starch and the at least one polymer, wherein the composition is formed by melting and mixing the thermoplastic starch and the at least one polymer under conditions that reduce or maintain the water content of the composition at less than about 1% by weight while in a melted state.

25. A composition of matter as declined in claim 24, wherein the thermoplastic starch is formed from starch that has been initially predried to below its natural water content.

26. A composition of matter as defined in claim 24, wherein the thermoplastic starch is formed from starch that initially includes its natural water content, wherein the natural water content of the starch is reduced while the thermoplastic starch is in a melted state.

27. A composition of matter as defined in claim 24, wherein the composition, after being mixed and melted, is cooled with water so as to substantially solidify the composition and allowed to reabsorb water so that the substantially solidified composition has a water content in a range from about 1% to about 6% by weight.

28. A composition of matter that is at least partially biodegradable comprising:

thermoplastic starch formed by mixing starch an at least one plasticizing agent under conditions that result in the formation of a thermoplastic melt so that the thermoplastic melt has a water content of less than 5% while in a melted state, wherein the plasticizing agent is selected from the group consisting of glycerin, sorbitol, sugar alcohols, hydroxy acids, polyvinyl alcohol, and mixtures thereof; and at least one polyesters copolymer having both aliphatic and aromatic blocks, wherein the composition is formed by first melting and mixing the thermoplastic starch and the at least one polymer under conditions that reduce or maintain the water content of the composition at less than about 1% by weight while in a melted state, followed by cooling the melted composition with water in order to substantially solidify the composition and allowing it to reabsorb water so that the substantially solidified composition has a final water content in a range from about 1% to about 6% by weight.

29. A composition of matter as defined in claim 27, wherein the thermoplastic starch is formed from starch that has been initially predried to below its natural water content.

30. A composition of matter as defined in claim 27, wherein the thermoplastic starch is formed from starch that initially includes its natural water content, wherein the natural water content of the starch is reduced while the thermoplastic starch is in a melted state.

* * * * *

UNITED STATES PATENT AND TRADEMARK OFFICE
CERTIFICATE OF CORRECTION

PATENT NO. : 6,096,809
DATED : August 1, 2000
INVENTOR(S) : Jurgen Lorcks; Winifried Pommeranz; Harald Schmidt It is certified that error appears in the above-identified patent and that said Letters Patent is hereby corrected as shown below:

Column 7,
Table 1, under the heading "1" approximately 17 lines down, after: "Injection molding" change "+" to -- + <.4%* --

Column 9,
Table 3, under the heading "18" and "20", to the right of "T°C": change "21S" to -- 215 -- and change "20S" to -- 205 --
Table 3, under the heading "19", to the right of "Pressure Bar" change "3S" to -- 35 --
Beneath Table 3, after "³Filler," change "microized" to -- micronized --

Column 11,
Under Table 4, after "⁶PCL (Polycaprolactone)" change "+" to -- = --

Column 12,
Line 61, after "acids," change "playvinyl" to -- polyvinyl --

Column 14,
Line 63, after "as" change "declined" to -- defined --

Column 15,
Line 12, after "starch" change "an" to -- and --
Line 20, after "one" change "polyesters" to -- polyester --

Signed and Sealed this

Eighteenth Day of December, 2001

JAMES E. ROGAN
Director of the United States Patent and Trademark Office